United States Patent
Lin et al.

(10) Patent No.: US 9,790,311 B2
(45) Date of Patent: Oct. 17, 2017

(54) ORGANIC-INORGANIC COMPOSITE RESIN, COATING COMPOSITION CONTAINING THE SAME AND APPLICATION THEREOF

(71) Applicant: ETERNAL MATERIALS CO., LTD., Kaohsiung (TW)

(72) Inventors: Sheng-Wei Lin, Kaohsiung (TW); Mao-Jung Yeh, Kaohsiung (TW)

(73) Assignee: ETERNAL MATERIALS CO., LTD., Kaohsiung (TW)

( * ) Notice: Subject to any disclaimer, the term of this patent is extended or adjusted under 35 U.S.C. 154(b) by 54 days.

(21) Appl. No.: 14/542,955

(22) Filed: Nov. 17, 2014

(65) Prior Publication Data

US 2015/0140322 A1    May 21, 2015

(30) Foreign Application Priority Data

Nov. 18, 2013    (TW) .............................. 102141951 A (51) Int. Cl.
| | | |
|---|---|---|
| *C08F 292/00* | (2006.01) | |
| *C08K 9/06* | (2006.01) | |
| *C03C 17/00* | (2006.01) | |
| *C09D 151/10* | (2006.01) | |

(52) U.S. Cl.
CPC .......... *C08F 292/00* (2013.01); *C03C 17/009* (2013.01); *C08K 9/06* (2013.01); *C09D 151/10* (2013.01); *C03C 2217/29* (2013.01); *C03C 2217/78* (2013.01); *Y10T 428/263* (2015.01)

(58) Field of Classification Search
USPC .................................... 428/428, 447; 528/26
See application file for complete search history.

(56) References Cited

U.S. PATENT DOCUMENTS

| 4,348,462 A * | 9/1982 | Chung .................. C08F 230/08 427/515 |
|---|---|---|
| 6,327,011 B2 | 12/2001 | Kim |
| 2001/0036554 A1 * | 11/2001 | Jin .......................... B32B 27/08 428/412 |
| 2003/0134951 A1 | 7/2003 | Yamaya et al. |
| 2014/0001075 A1 * | 1/2014 | Remington, Jr. ..... C03C 17/005 206/524.3 |

FOREIGN PATENT DOCUMENTS

| CN | 1424353 A | 6/2003 |
|---|---|---|
| CN | 1214906 C | 8/2005 |
| CN | 1235996 C | 2/2006 |
| JP | 405039375 A * | 2/1993 |
| TW | 200916311 | 4/2009 |
| WO | 01/21375 A1 | 3/2001 |

OTHER PUBLICATIONS

Non-English Office Action dated May 19, 2015 with Search Report for Taiwan Application No. 102141951.
Espacenet English abstract of CN 1544560 A (corresponding to CN 1235996 C), Nov. 2004.
Espacenet English abstract of TW 200916311, Apr. 2009.
Chinese Office Action dated Feb. 29, 2016 for Chinese Application No. 201410226384.9 with English translation.
Espacenet English abstract of CN 1424353 A.
"Organosilicon Emulsion and Application Thereof" with English translation, Sep. 30, 2008.

* cited by examiner

*Primary Examiner* — Tae H Yoon
(74) *Attorney, Agent, or Firm* — Ladas & Parry LLP (57) ABSTRACT

The present invention provides an organic-inorganic composite resin, which is derived from: (A) an inorganic portion comprising ($a_1$) one or more siloxane monomers of formula $(R^1)_n Si(OR^2)_{4-n}$, wherein $R^1$, $R^2$ and n are as defined in the specification; ($a_2$) an acidic catalyst, ($a_3$) silica, and ($a_4$) a siloxane oligomer; and (B) an organic portion comprising ($b_1$) one ore more acrylic monomers; wherein the weight ratio of the inorganic portion to the organic portion ranges from 2:8 to 8:2. The present invention also provides a coating composition comprising the aforementioned organic-inorganic composite resin and a hardener. The present invention further provides a reinforced substrate coated with the aforementioned coating composition.

13 Claims, 2 Drawing Sheets

ORGANIC-INORGANIC COMPOSITE RESIN, COATING COMPOSITION CONTAINING THE SAME AND APPLICATION THEREOF

BACKGROUND OF THE INVENTION

1. Field of the Invention

The present invention relates to a resin, especially to an organic-inorganic composite resin with improved toughness and hardness.

The present invention also relates to a coating composition, which comprises said organic-inorganic composite resin, and a hardener. The coating composition simultaneously has improved toughness and hardness.

The present invention further relates to a reinforced substrate, which is a substrate coated with said coating composition to prevent the substrate surface from scratches or to avoid shattered substrate fragments when the substrate is impacted.

2. Description of the Related Art

Glass is characterized by its high transparency, chemical resistance, heat resistance, and other properties, so it is often used as panels of electronic products (such as liquid crystal screens, cell phones, tablet PCs or the like). However, glass is fragile and have poor scratch resistance and poor impact resistance, so glass may not only be damaged and break but also generate shattered glass fragments that could hurt users or surrounding people when the glass is impacted. Moreover, electronic devices are lighter and thinner recently, and the thickness of a glass substrate has accordingly decreased. Nevertheless, this change exposes the disadvantages of glass. Therefore, it is necessary to improve the glass substrate.

When glass is used as substrates, two means can be conducted to improve the glass substrates. One is adjusting the composition of glass itself to improve the properties of the glass substrate, while the other is coating a strengthening coating on the surface of the glass substrate to resist scratching and impact.

U.S. Pat. No. 6,327,011 B2 discloses a thin glass substrate of a liquid crystal display device, which comprises a glass substrate and a protective layer formed on the back surface of the glass substrate. The protective layer comprises an organic layer and an inorganic layer, wherein the inorganic layer has enhanced compressive stress and the organic layer has a low viscosity coefficient, which are both used to strengthen the glass substrate for preventing cracks which occur due to an external impact. However, the organic layer and inorganic layer are double layers which need to be applied separately, so the procedure for producing the thin glass substrate comprises two steps of application, which complicates the procedure and increases the chance of obtaining more thin glass substrates with inferior quality.

TW 200916311 discloses coating a glass substrate with an organic layer containing a thermosetting resin to strengthen the toughness of the substrate. However, compared with the thin glass substrate disclosed in U.S. Pat. No. 6,327,011 B2, the glass substrate of TW 200916311 merely has an organic layer and cannot generate superior compressive stress. Although the procedure requires shorter time, the glass substrate does not have sufficient protection.

Overall, the relevant industries are searching for a coating of a glass substrate which generates the desired hardness and toughness, provides the substrate with full protection, and makes the procedure simple.

SUMMARY OF THE INVENTION

The main objective of the present invention is to provide an organic-inorganic composite resin which comprises (A) inorganic siloxane resin and (B) organic acrylic resin. The siloxane resin and the acrylic resin used in the present invention have excellent compatibility.

A further objective of the present invention is to provide a coating composition which comprises said organic-inorganic composite resin and an optional hardener. A thin film formed by the coating composition of the present invention possesses excellent toughness, chemical resistance and flexibility as well as high hardness.

A yet further objective of the present invention is to provide a reinforced substrate which comprises a thin film thereon formed by said coating composition. Due to the formation of the thin film, the substrate has improved toughness, hardness and anti-yellow properties while simultaneously retaining transparency. A superior adhesion occurs between the thin film and the substrate.

DETAILED DESCRIPTION OF THE INVENTION

In this context, unless otherwise limited, a singular term (such as "a") also includes a plural form thereof. In this context, all embodiments and exemplary terms (for example, "such as") only aim at making the present invention more prominent, but are not intended to limit the scope of the present invention; terms in this specification should not be construed as implying that any component not claimed may form a necessary component for implementing the present invention.

An organic-inorganic composite resin of the present invention is derived from: (A) an inorganic portion and (B) an organic portion, wherein the inorganic portion comprises ($a_1$) one or more siloxane monomers of formula $(R^1)_n Si(OR^2)_{4-n}$, wherein $R^1$ is independently H, phenyl, $C_{1-6}$ alkyl or a monovalent organic group with an end group selected from amino group, epoxy group, vinyl group, isocyanate group, mercapto group or (meth)acryloxy group; $R^2$ is $C_{1-3}$ alkyl; and n is an integer from 0 to 3; ($a_2$) an acidic catalyst; ($a_3$) silica; and ($a_4$) a siloxane oligomer; and the organic portion comprises ($b_1$) one ore more acrylic monomers, wherein the weight ratio of the inorganic portion to the organic portion depends on desired properties of the obtained coating composition and may range from 2:8 to 8:2.

In the organic-inorganic composite resin of the present invention, if the content of the inorganic portion is too low, the organic-inorganic composite resin may have insufficient hardness and if the content of the organic portion is too low, the organic-inorganic composite resin may have insufficient toughness and poor chemistry resistance. The weight ratio of the inorganic portion to the organic portion preferably ranges from 3:7 to 7:3.

For ($a_1$) one or more siloxane monomers of formula $(R^1)_n Si(OR^2)_{4-n}$ of the inorganic portion, $R^1$ is preferably H, methyl, ethyl, vinyl, N-(β-aminoethyl)-γ-aminopropyl, aminopropyl, γ-glycidoxypropyl, β-(3,4-epoxycyclohexyl) ethyl, 3-(methacryloyloxy)propyl or mercapto propyl and $R^2$ is preferably methyl or ethyl.

In one preferable aspect, the component ($a_1$) is a compound selected from the group consisting of: trimethylmethoxysilane, trimethylethoxysilane, dimethyldimethoxysilane, dimethyldiethoxysilane, methyltrimethoxysilane, methyltriethoxysilane, methyltripropoxysilane, tetraethoxysilane, vinyltrimethoxysilane, vinyltriethoxysilane, γ-glycidoxypropyltrimethoxysilane, γ-glycidoxypropyltriethoxysilane, (γ-glycidoxypropyl)methyldimethoxysilane, (γ-glycidoxypropyl)methyldiethoxysilane, β-(3,4-epoxycyclohexyl)ethyl trimethoxy silane, 3-(methacryloyloxy)propyltrimethoxysilane, N-(β-aminoethyl)-γ-aminopropyl methylbimethoxysilane, N-(β-aminoethyl)-γ-aminopropyltrimethoxysilane, γ-aminopropylmethyldiethoxysilane, γ-aminopropyltriethoxysilane, γ-aminopropyltrimethoxysilane and γ-mercaptopropyltrimethoxysilane.

The ($a_1$) siloxane monomers of the inorganic portion of the present invention are present in a range from about 40 wt % to about 90 wt % and preferably from about 60 wt % to about 80 wt %, of the total weight of the solid content of the inorganic portion.

The ($a_2$) acidic catalyst of the inorganic portion comprises but is not limited to citric acid, hydrochloric acid, acetic acid or any acid substances that can serve as an acidic catalyst known by a person of ordinary skill in the art and is preferably citric acid or acetic acid. The amount of the acid catalyst of the present invention ranges from about 0.01 wt % to about 1.5 wt % and preferably ranges from about 0.05 wt % to about 1.0 wt %, of the total weight of the solid content of the inorganic portion.

The ($a_3$) silica of the inorganic portion increases the hardness of the organic-inorganic composite resin. It is preferably present in aqueous solution that is usually a milky white translucent solution according to its appearance. The silica has a particle size ranging from about 10 nm to about 100 nm and preferably from about 20 nm to about 30 nm. Since the silica has high content of hydroxyl groups, it has high reaction activity and superior stability. The amount of the ($a_3$) silica of the present invention ranges from about 5 wt % to about 30 wt % and preferably from about 10 wt % to about 25 wt %, of the total weight of the solid content of the inorganic portion.

A general siloxane resin easily becomes hard and fragile after it is processed to be a film. A common solution is to add D-type siloxane monomers but the linear polymerization is hard to be controlled during the polymerization, so there is limited effect on the improvement of the properties. The inorganic portion of the present invention comprises the ($a_4$) siloxane oligomer including alkoxy group, which can improve the properties of the coating composition after it is cured, so the reinforced substrate retains high hardness and has superior toughness. The siloxane oligomer suitable for the present invention has a structure of formula (I): $(R^5{}_3SiO_{1/2})_x(R^6{}_2SiO_{2/2})_y(R^7SiO_{3/2})_z$ (formula (I)), wherein $R^5$, $R^6$, and $R^7$ are independently methyl, ethyl, phenyl, —OH group, methoxy or ethoxy; x>0, y>0 and z≥0, preferably 0<x<23, 0<y<22 and 0≤z<30.

In one aspect, the ($a_4$) siloxane oligomer of the present invention has a structure of formula (II), of formula (III) or of a mixture of both formulae:

wherein $R^3$ can be the same or different and is independently methyl or phenyl; $R^4$ can be the same or different and is independently H, methyl or ethyl and preferably methyl; m is an integer from 2 to 20 and preferably is an integer from 5 to 12. The siloxane oligomer is preferably linear. In a preferred aspect, the siloxane oligomer of the present invention is a compound of formula (II).

The molecular weight of the siloxane oligomer of the present invention depends from processability of the obtained coating composition. When the molecular weight is too high, the siloxane oligomer tends to become solid and is difficult to be processed. When the molecular weight is too low, the organic-inorganic composite resin is still hard and fragile and has inferior toughness after it is processed to be a film. Therefore, the siloxane oligomer has a molecular weight preferably ranging from about 800 to about 2500 and more preferably ranging from about 1000 to 2200.

The amount of the (a4) siloxane oligomer ranges from about 5 wt % to about 23 wt % and preferably ranges from about 8 wt % to about 20 wt %, of the total weight of the solid content of the inorganic portion. If the amount of the (a4) siloxane oligomer is too high, the organic-inorganic composite resin is too soft and has low hardness, so that the coating made of the organic-inorganic composite resin has insufficient hardness and is easy to be scratched. If the amount of the ($a_4$) siloxane oligomer is too low, the coating has poor toughness, cannot overcome the poor properties, such as the hard and fragile properties, of the coating and cannot adhere closely to glass substrates.

The inorganic portion of the organic-inorganic composite resin of the present invention is a siloxane resin, which is synthesized by the sol-gel process. The properties of the resultant sol-gel are influenced by the species of raw materials, species and concentration of catalysts, pH value, temperature, species and concentration and content of solvents. In an embodiment of the present invention, solvents are optional in the synthesis process and the solvent comprises but is not limited to alcohol, ether alcohol or a mixture thereof and is preferably ether alcohol. The solvent is, for example, but not limited to ethylene glycol monobutylether (BCS), ethylene glycol monoethyl ether acetate (CAC), ethylene glycol monoethyl ether (ECS), propylene glycol monomethyl ether, propylene glycol monomethyl ether acetate (PMA), propylene glycol methyl ether propionate (PMP) or a mixture of two or more of the foregoing substances.

The organic portion of the organic-inorganic composite resin of the present invention is an acrylic resin, which comprises a polymer unit derived from ($b_1$) one ore more acrylic monomers. Suitable acrylic monomers of the present invention include, for example, but are not limited to methacrylic acid, methyl (meth)acrylate, ethyl (meth)acrylate, propyl (meth)acrylate, n-butyl (meth)acrylate, 2-ethylhexyl (meth)acrylate, n-octyl (meth)acrylate, hexyl (meth)acrylate, pentyl (meth)acrylate, heptyl (meth)acrylate, iso-octyl (meth)acrylate, isononyl (meth)acrylate, isobutyl (meth)acrylate, 2-butyl-(meth)acrylate, decyl (meth)acrylate, isodecyl (meth)acrylate, isotridecyl (meth)acrylate, benzyl (meth)acrylate, lauryl (meth)acrylate, 2-hydroxyethyl acrylate, 2-hydroxyethyl methacrylate, 2-hydroxypropyl methacrylate, 2-hydroxypropyl acrylate, or a mixture of two or more of the foregoing substances.

The acrylic resin of the present invention has a glass transition temperature in a range from −10° C. to 70° C. to prevent the substrate surface from breaking or avoid scattered substrate fragments when the substrate is impacted. The glass transition temperature is preferably in a range from 0° C. to 60° C. and more preferably from 20° C. to 50° C. If the glass transition temperature of the organic portion is higher than 70° C., the organic-inorganic composite resin has poor leveling property and poor processability and the coating is overly fragile and has insufficient toughness. If the glass transition temperature of the organic portion is lower than −10° C., it is difficult for the coating to form a film.

The silicone-acrylic resins available on the market are mostly polymerized by acrylic monomers and acrylic siloxane monomers but they have poor storage stability since the functional group (Si—(OR')$_3$, R' is methyl, ethyl or propyl) of siloxane is easily hydrolyzed due to the influence of moisture, which incurs a cross-linking reaction. If the degree of cross-linking in an organic solvent is too high, gel is easily formed and a rigid structure would be formed. Moreover, since the hardness and toughness generally cannot increase simultaneously. That is, if a resin has a high hardness, it generally has inferior toughness and if a resin has superior toughness, it generally has low hardness. However, the organic-inorganic composite resin of the present invention is a novel silicone-acrylic resin, which comprises (A) an inorganic siloxane resin and (B) an organic acrylic resin. The method for producing the same comprises synthesizing a siloxane resin and then copolymerizing the siloxane resin and acrylic monomers in a desired ratio (weight ratio from 2:8 to 8:2). By copolymerization, the organic-inorganic composite resin is formed and possesses high toughness and weather resistance as siloxane resin and high toughness and chemical resistance (solvent resistance and alcohol resistance) as acrylic resin. Therefore, the organic-inorganic composite resin of the present invention can be applied for optical elements or electronic elements to simultaneously increase the hardness and toughness of the surface of the substrate used in the elements; to prevent the substrate from scratching; to retain the integrity of the breaking side of the substrate after the substrate is impacted; to avoid scattered fragments or to protect the frame of the substrate.

According to an embodiment of the present invention, a method for preparing the organic-inorganic resin comprises: providing the inorganic portion; providing the organic portion and compounding the inorganic portion and the organic portion.

A. Providing the Inorganic Portion:

The ($a_1$) one or more siloxane monomers of formula $(R^1)_n Si(OR^2)_{4-n}$ as described in the forgoing context, ($a_2$) an acidic catalyst, ($a_3$) silica, and ($a_4$) a siloxane oligomer are mixed and heated at 60° C.-90° C. for 4-8 hours to form a transparent sol-gel with good flowability.

B. Providing the Organic Portion:

One ore more acrylic monomers are provided, so that the entire organic portion has a glass transition temperature in a range from −10° C. to 70° C.

C. Compounding the Inorganic Portion and Inorganic Portion

The inorganic portion and the organic portion are mixed in a weight ratio of 2:8 to 8:2, optionally added with known additives (such as coupling agent, solvents, initiators or the like) and then reacted for several hours (about 2 hr-8 hr) at a suitable temperature (about 60° C.-100° C.) to form an organic-inorganic composite resin. For completeness of curing, after the above-mentioned reaction is completed, the organic-inorganic composite resin is optionally added with an initiator and solvents to react for a further period of time (about 2 hr-8 hr).

The optional solvent used in the step (A) comprises but is not limited to alcohol, ether alcohol or a mixture thereof and is preferably ether alcohol. The ether alcohol is as defined in the forgoing context.

The coupling agent that can be used in the step (C) is known by a person of ordinary skill in the art and can be, for example, 3-isobutylenepropyltrimethoxysilane. Such coupling agent is composed of two portions: one having affinity for inorganic group that reacts with the siloxane resin and the other having affinity for organic group that reacts with the acrylic resin. The optional solvent used in the step (C) is preferably ether alcohol and may comprise but is not limited to ethylene glycol monobutyl ether, ethylene glycol monoethyl ether acetate, ethylene glycol monoethyl ether, propylene glycol monomethyl ether, propylene glycol monomethyl acetate, propylene glycol monomethyl ether propionate or a mixture thereof. The optional initiator used in the step (C) is known by a person of ordinary skill in the art and can be, for example, benzoyl peroxide, dicumyl peroxide, tert-butyl hydroperoxide, cumene hydroperoxide, tert-butyl monoperoxymaleate, tert-butyl peroxy-2-ethylhexanoate (TBPO), tert-butyl hydroperoxide, acetyl peroxide, dilauryl peroxide, azodiisobutyronitrile (AIBN), 2,2'-azobisisoheptonitrile, a mixture of a peroxide and amino acid or sulfonic acid, a mixture of a peroxide and cobalt compound a mixture thereof and is preferably azodiisobutyronitrile or tert-butyl peroxy-2-ethylhexanoate.

The present invention also relates to a coating composition, which comprises the aforementioned organic-inorganic composite resin and optional hardener depending on the oven temperature. The hardener used in the present invention is known by a person of ordinary skill in the art and has at least one functional group that reacts with the organic-inorganic composite resin. The functional group is selected from an isocyanate group (—NCO), an epoxy group, oxazolyl, or an amino group (—NH$_2$) or NHR. The hardener triggers the crosslinking between molecules. For example, the OH group containing organic-inorganic composite resin (OH value is about 40 to 150 mgKOH/g) reacts with a hardener to form a crosslinking product or self-crosslinking occurs. The hardener is preferably an isocyanate or amino resin. The amount of the hardener usually depends on the desired crosslinking density for the coating composition. For example, when the hardener is an isocyanate, the ratio of the OH value of the organic-inorganic composite resin to the NCO equivalent weight of the isocyanate hardener ranges from about 0.8 to about 1.1. When the hardener is an amino resin, the weight ratio of the organic-inorganic composite resin to the solid content of the amino resin hardener ranges from about 9:1 to about 7:3.

In the coating composition of the present invention, the organic-inorganic composite resin is present in an amount of at least 1 wt %, preferably between 20.0 wt % to 70.0 wt %, based on the total weight of the composition. When the hardener is added, the content of the hardener is in a range from about 0.1 wt % to about 50 wt %, preferably from about 10 wt % to about 40%, based on the total weight of the solid content of the coating composition.

The above-mentioned isocyanate hardener may be monoisocyanate, diisocyanate or multi-isocyanate. A suitable isocyanate hardener is, for example, but not limited to 1,6-hexamethylene diisocyanate (HDI), 1,4-cyclohexane diisocyanate (CHDI), toluene diisocyanate (TDI), 4,4'-diphenylmethane diisocyanate (MDI), isophorone diisocyanate (IPDI), 1,6-hexamethylene diisocyanate trimer, isophorone diisocyanate trimer or a combination thereof. The above-mentioned amino resin hardener can be, for example, but is not limited to methylated melamine resin, butylated melamine resin, iso-butylated melamine resin, butylated benzol melamine resin or a combination thereof.

The coating composition may be further added with an additive known by a person of ordinary skill in the art and comprises but is not limited to a solvent, promoter, dispersant, antifoaming agent, antioxidant, flatting agent, tackifier, stabilizer, leveling agent, wetting agent, adhesion promoter, antistatic agent or a mixture of two or more of the foregoing substances. A film formed from the coating composition of the present invention has excellent chemical resistance, high hardness and superior toughness, so it is hard to be broken. Therefore, the film can be applied for optical materials, touch panels, soft flexible electronic materials or the like. The amount of the solvent ranges from about 30 wt % to about 95 wt % and preferably from about 60 wt % to about 85%, based on the total weight of the composition.

The present invention further provides a reinforced substrate which comprises a substrate and a film made of the foregoing coating composition and formed on at least one surface of the substrate. The reinforced substrate of the present invention is determined to have a light transmission of at least 90%, preferably ranging from 90% to 99%, according to the standard test method, JIS K7136. The substrate may be made of glass, metal or plastic, but is preferably glass. The film has a thickness ranging from about 1 μm to about 100 μm, preferably from about 10 μm to about 30 μm. The film has a pencil hardness of at least 3H. Since electronic devices have become lighter and thinner, surfaces of a conventional substrate of electronic devices are easily scratched. The film of the reinforced substrate of the present invention serves as a protective layer with high hardness, superior toughness and high transparency, so the present invention overcomes the disadvantages of the conventional substrates as discussed above.

In one embodiment of the present invention, at least one surface of a substrate is coated with the foregoing coating composition as a protective layer. The coating composition of the present invention may be a two-component thermosetting resin, which is applied onto the substrate using any method known by a person of ordinary skill in the art. In one example, a method for manufacturing the reinforced substrate of the present invention comprises:

(I) mixing the organic-inorganic composite resin, optional hardener, known additives (if desired), such as a solvent and promoter to form a coating composition and applying the coating composition to a surface of a substrate to form a film;

(II) transporting the coated substrate to an oven to evaporate solvents and then heating the coated substrate at a temperature required by the curing of the thermosetting resin for few minutes until the thermosetting resin is cured.

If needed, the steps (I) and (II) can be repeated to obtain a multi-layered protective layer.

In step (I), the coating composition may be applied to the substrate by coating, spraying, screen printing, dip coating or the like.

The promoter used in step (I) is at least one selected from the group consisting of methyl morpholine, ethyl morpholine, triethyl amine, dimethyl benzyl amine, dimethyl ethanol amine, ethylene diamine, dimethyl lauryl amine, dimethyl piperazine, triethylene diamine, tetramethyl ethylene diamine, tetramethyl hexamethylene diamine, 1,3,5-tridiaminomethyl phenol, 1,4-diaza-(2,2,2)bicyclooctane, hexamethyl triethylene tetramine, lead octoate, dibutyl tin dilaurirate (DBTL), tin ethyl hexanoate and zirconium octoate, and is preferably dibutyl tin dilaurirate.

The solvent used in step (I) can be an ether alcohol, ester or a mixture thereof and preferably an ether alcohol solvent.

Suitable ether alcohol solvents of the present invention are, for example, but not limited to ethylene glycol monobutylether (BCS), ethylene glycol monoethyl ether acetate (CAC), ethylene glycol monoethyl ether (ECS), propylene glycol methyl ether, propylene glycol monomethyl ether acetate (PMA), propylene glycol monomethyl ether propionate, butanediol monomethyl ether or a mixture thereof. The ester solvents of the present invention are, for example, but not limited to isobutyl acetate (IBAC), ethyl acetate (EAC), butyl acetate (BAC), ethyl formate, methyl acetate, ethoxyethyl acetate, ethoxypropyl acetate, ethyl isobutyrate, propylene glycol monomethyl ether acetate, amyl acetate or a mixture thereof.

The novel organic-inorganic composite resin of the present invention simultaneously retains the hardness and weather resistance of the siloxane resin and the toughness and chemical resistance of the acrylic resin. Therefore, the composite resin mixed with a hardener serves as a coating composition for a substrate, so the substrate surface has increased toughness and hardness to maintain the integrity of the substrate when it is impacted, which thus prevents shattered fragments and the substrate from being scratched. Furthermore, the reinforced substrate can be produced by applying a single layer of coating composition including the composite resin simultaneously having the organic portion and the inorganic portion to a substrate. Therefore, the procedure is simplified and saves time, which meets the requirements of the relevant industries.

EXAMPLES

The following examples will further illustrate the present invention but not serve as any limitation thereto. Any modifications and alterations that can be easily achieved by a person of ordinary skill in the art will be encompassed in the disclosure of the specification and the scope of the appended claims.

Preparation of the Organic-Inorganic Composite Resin
Provision of Inorganic Portion ($a_1$)-($a_4$) mixed in predetermined ratios (as shown in Table 1) were premixed in different reaction vessels and were heated to 80±2° C. under nitrogen atmosphere for lasting 6 hours.

TABLE 1

|  | Preparation Example | a | b | c | d | e |
|---|---|---|---|---|---|---|
| $a_1$ | Methyltrimethoxysilane (DOW CORNING ® Z-6070 SILANE) | 0 | 0 | 118.1 | 60.5 | 0 |
|  | Tetraethoxysilane (DOW CORNING ® Z-6697 SILANE) | 59.6 | 109 | 89.7 | 67.5 | 89.7 |
|  | γ-glycidoxypropyltrimethoxysilane (DOW CORNING ® Z-6040 SILANE) | 60.3 | 60.3 | 60.3 | 60.3 | 76.9 |
|  | Vinyltrimethoxysilane (DOW CORNING ® Z-6300 SILANE) | 118 | 0 | 0 | 57.6 | 0 |
|  | 3-aminopropyltrimethoxysilane (ShinEtsu KBM-903) | 0 | 118.1 | 0 | 0 | 118.1 |
|  | 3-(methacryloyloxy)propyltrimethoxysilane (ShinEtsu KBM-503)[1] | 0.2 | 0.2 | 0.2 | 0.2 | 0.2 |
| $a_2$ | Citric acid | 0 | 3.5 | 1.75 | 0 | 0 |
|  | Acetic acid | 1.75 | 0 | 0 | 3.5 | 1.75 |
| $a_3$ | Silica (Nissan snowtex-o 20% solid content) | 304 | 304 | 304 | 309.8 | 334.3 |
| $a_4$ | Siloxane oligomer (Dow Corning 3074)[2] | 94.6 | 10.4 | 39.9 | 69.3 | 63 |
| Total weight (g) | | 638.4 | 605.5 | 613.9 | 628.7 | 684 |
| Total solid content (g) | | 393.5 | 358.8 | 369 | 377.36 | 414.76 |
| $a_4$/Total solid content | | 24% | 2.8% | 10.8% | 18.3% | 15.2% |

[1]: ShinEtsu KBM-503

[2]: Dow Corning 3074: molecular weight 100-1500 wherein R' is methyl or phenyl, and the methyl/phenyl ratio in R' is 1/1 and m' is an integer of about 5-10.

As desired, ethylene glycol monobutylether (BCS) was then added to adjust the inorganic portion to have a total solid content of about 25% and the heating was kept at the same temperature for 2 hours.

Provision of Organic Portion

Acrylic monomers in different ratios (as shown in Table 2) were taken.

TABLE 2

|  | Preparation Example | I | II | III |
|---|---|---|---|---|
| Acrylic monomers | methacrylic acid | 7.4 | 2.1 | 6.3 |
|  | methyl methacrylate | 49.5 | 8 | 41 |
|  | hydroxypropyl methacrylate | 10.8 | 18.6 | 27.9 |
|  | n-butyl methacrylate | 43.4 | 36.2 | 53.6 |
|  | 2-ethylhexyl acrylate | 16.6 | 58 | 0 |
|  | styrene | 0 | 5.6 | 0 |
| Total weight(g) | | 127.7 | 128.5 | 128.8 |
| Tg | | 45 | 72.5 | 30.7 |

The organic portions Nos. I to III were added into the reaction vessels including inorganic portions. The combinations are shown in Table 3-1 and Table 3-2.

Propylene glycol monomethyl ether acetate (PMA, about half of the total weight of the acrylic monomers) and tert-butyl peroxy-2-ethylhexanoate (about one-thousandth of the total weight of the acrylic monomers) were added.

They were heated at 80° C. for 8 hours to form an organic-inorganic composite resin.

TABLE 3-1

| Example | 1 | 2 | 3 | 4 | 5 | 6 |
|---|---|---|---|---|---|---|
| Content in the reaction vessel | cI | dI | eI | cIII | dIII | eIII |
| Inorganic:Organic | 3:7 | 3:7 | 3:7 | 3:7 | 3:7 | 3:7 |

TABLE 3-2

| Comparative Example | 1 | 2 | 3 | 4 | 5 | 6 | 7 | 8 | 9 |
|---|---|---|---|---|---|---|---|---|---|
| Contents in the reaction tank | aI | bI | aII | bII | cII | dII | eII | aIII | bIII |
| Inorganic:Organic | 3:7 | 3:7 | 3:7 | 3:7 | 3:7 | 3:7 | 3:7 | 3:7 | 3:7 |

Preparation of the Coating Composition

Each of the organic-inorganic composite resins made from Examples 1-6 and Comparative Examples 1-9 was homogenously mixed with a hardener and additive to form a thermosetting coating composition under specific conditions shown in Table 4.

TABLE 4

| Coating composition | Raw material | Amount |
|---|---|---|
| Organic-inorganic composite resin | Organic-inorganic composite resins obtained from Examples 1-6 and Comparative Examples 1-9 (solid content ~25%) | 60.0 g |
| Hardener | Polyisocyanate (Bayer N-3390) | 6.7 g |
| Solvent | PMA | 40.0 g |
| Promoter | dibutyltin dilaurate (DBTL), 1% | 0.05 g |

Preparation of the Reinforced Substrate

Each resultant coating composition was coated on a 1-mm glass plate using a coater No. 65 and was cured by baking at 120° C. for 30 minutes to form a film with a thickness of about 20 μm.

Tests of Physical Properties

Each resultant reinforced substrate was tested to observe its toughness, transparency, chemical resistance, adhesion, result of impact test, pencil hardness and alcohol resistance. The tests are described as follows.

IV. T-bending Test:

Each coating composition was coated on an iron sheet and was cured under 120° C. for 30 minutes to form a film with a thickness of 20 μm. The iron sheet coated with the coating composition was undergoing T bend test according to the standard method JIS-H4001-6.4. The first bend is represented by 0 T, the second one is represented by 1 T and so on. The fewer is the T number, the better is the toughness.

Results of the foregoing tests are shown in Table 5.

TABLE 5

|  | Thickness of protective layer | T-bend test | Transparency | Solvent resistance | Adhesion | Impact test | Pencil hardness | Alcohol resistance |
| --- | --- | --- | --- | --- | --- | --- | --- | --- |
| Ex. 1 | 20 μm | 2~3 T | >95% | ○ | ○ | ○ | 3 H | ○ |
| Ex. 2 | 20 μm | 3 T | >95% | ○ | ○ | ○ | 2~3 H | ○ |
| Ex. 3 | 20 μm | 2~3 T | >95% | ○ | ○ | ○ | 3 H | ○ |
| Ex. 4 | 20 μm | 2 T | >95% | ○ | ○ | ○ | 4 H | ○ |
| Ex. 5 | 20 μm | 3~4 T | >95% | ○ | ○ | ○ | 3~4 H | ○ |
| Ex. 6 | 20 μm | 4 T | >95% | ○ | ○ | ○ | 3~4 H | ○ |
| Comp. Ex. 1 | 20 μm | 5 T | >95% | ○ | ○ | X | H~2 H | ○ |
| Comp. Ex. 2 | 20 μm | 5 T | >95% | ○ | X | X | 3~4 H | ○ |
| Comp. Ex. 3 | 20 μm | 5 T | >95% | ○ | ○ | X | 2 H | ○ |
| Comp. Ex. 4 | 20 μm | 5 T | >95% | ○ | X | X | 3~4 H | ○ |
| Comp. Ex. 5 | 20 μm | 5 T | >95% | ○ | ○ | X | 3 H | ○ |
| Comp. Ex. 6 | 20 μm | 4 T | >95% | ○ | ○ | X | 2~3 H | ○ |
| Comp. Ex. 7 | 20 μm | 5 T | >95% | ○ | ○ | X | 3~4 H | ○ |
| Comp. Ex. 8 | 20 μm | 5 T | >95% | ○ | ○ | X | 2~3 H | ○ |
| Comp. Ex. 9 | 20 μm | 3~4 T | >95% | ○ | ○ | X | 4 H | ○ |

Note:
○ pass
X fail

Figure 1:
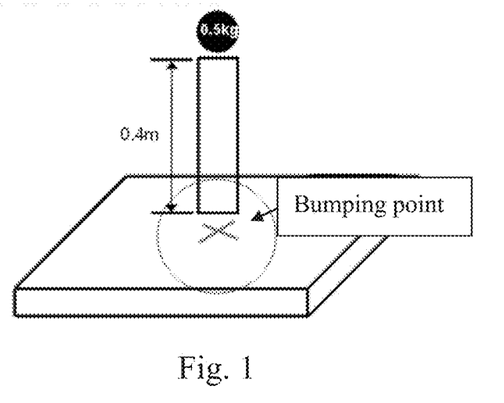
FIG. 1 is a perspective view illustrating the impact test used in the examples of the present invention.

I. Transparency: PerkinElmer Lambda 900.
II. Chemical resistance:
1. Solvent resistance: wiping the substrate for 150 times with xylene and methyl ethyl ketone to determine if there is any damage to the substrate.
2. Alcohol resistance: wiping the substrate for 150 times with alcohol to determine if there is any damage to the substrate.
III. Adhesion: Adhesion cross-cut test with 3M Scotch 600 tape.
IV. Impact Test:
Method: a 2J falling ball drops down to a test point on a surface of a glass and to determine if there is any damage to the substrate.
Steps:
1. Providing a tube with a length of 0.4 m on the glass surface, as shown in FIG. 1;
2. Allowing a steel ball with a diameter of 50 mm and a weight of 0.5 kg to freely fall down to the test point, also shown in FIG. 1;
3. Removing the steel ball from the substrate immediately after it bumps into the substrate to avoid repeated bumping; and
4. Observing the damage of the glass.
V. Pencil hardness: Mitsubishi, 1 Kg@glass.

Comparative Example 10

The organic portion and the inorganic portion were the same as Example 4 but the weight ratio of the inorganic portion to the organic portion was changed to 1:9 to proceed the tests for physical properties.

Example 7

The organic portion and the inorganic portion were the same as Example 4 but the weight ratio of the inorganic portion to the organic portion was changed to 2:8 to proceed the tests for physical properties.

Example 8

The organic portion and the inorganic portion were the same as Example 4 but the weight ratio of the inorganic portion to the organic portion was changed to 5:5 to proceed the tests for physical properties.

Example 9

The organic portion and the inorganic portion were the same as Example 4 but the weight ratio of the inorganic portion to the organic portion was changed to 7:3 to proceed the tests for physical properties.

Example 10

The organic portion and the inorganic portion were the same as Example 4 but the weight ratio of the inorganic portion and the organic portion was changed to 8:2 to proceed the tests for physical properties.

Comparative Example 11

The organic portion and the inorganic portion were the same as Example 4 but the weight ratio of the inorganic portion to the organic portion was changed to 9:1 to proceed the tests for physical properties.

Results of the foregoing tests are shown in Table 6.

TABLE 6

| | Inorganic: Organic | Thickness of protective layer | Toughness | Transparency | Solvent resistance | Adhesion | Impact test | Pencil hardness | Alcohol resistance |
|---|---|---|---|---|---|---|---|---|---|
| Comp. Ex. 10 | 1:9 | 20 μm | 2 T | >95% | ○ | ○ | X | 1~2 H | ○ |
| Ex.7 | 2:8 | 20 μm | 2 T | >95% | ○ | ○ | ○ | 3~4 H | ○ |
| Ex.4 | 3:7 | 20 μm | 2 T | >95% | ○ | ○ | ○ | 4 H | ○ |
| Ex.8 | 5:5 | 20 μm | 2~3 T | >95% | ○ | ○ | ○ | 4 H | ○ |
| Ex.9 | 7:3 | 20 μm | 3 T | >95% | ○ | ○ | ○ | 4~5 H | ○ |
| Ex.10 | 8:2 | 20 μm | 3 T | >95% | ○ | ○ | ○ | 4~5 H | ○ |
| Comp. Ex. 11 | 9:1 | 20 μm | 5 T | >95% | ○ | ○ | X | 7 H | ○ |

According to Table 5, it can be seen that the organic-inorganic composite resin of the present invention has excellent performance in terms of every property since it exhibits superior toughness, adhesion and pencil hardness and passes the impact test.

According to Table 6, it can be understood that the organic-inorganic composite resin of the present invention has most preferable high toughness and high hardness when the ratio of the inorganic portion to inorganic portion ranges from 8:2-2:8.

Figure 2:
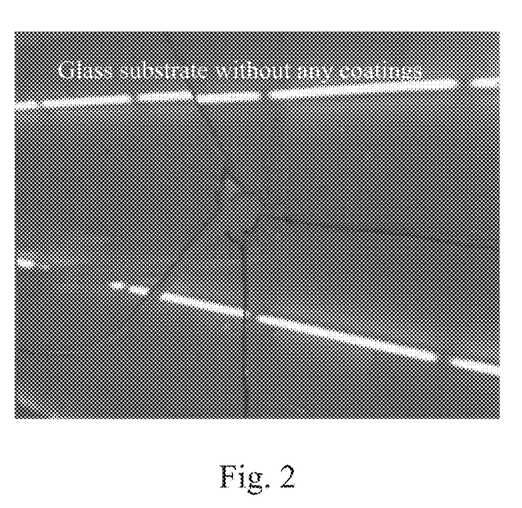
FIG. 2 is a photo of a glass substrate without coating any protective layer after impacted.
Figure 3:
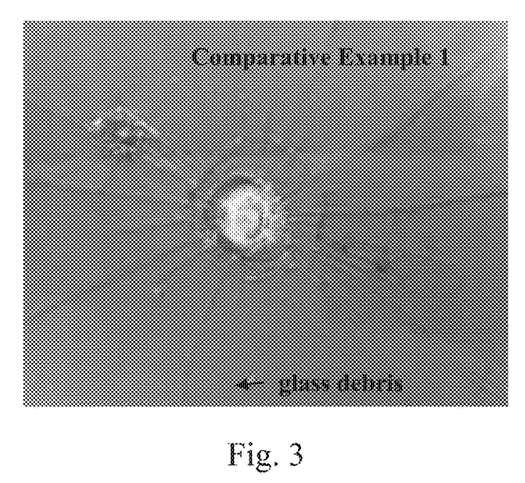
FIG. 3 is a photo of a glass substrate coated with the coating composition described in Comparative Example 1 after impacted.
Figure 4:
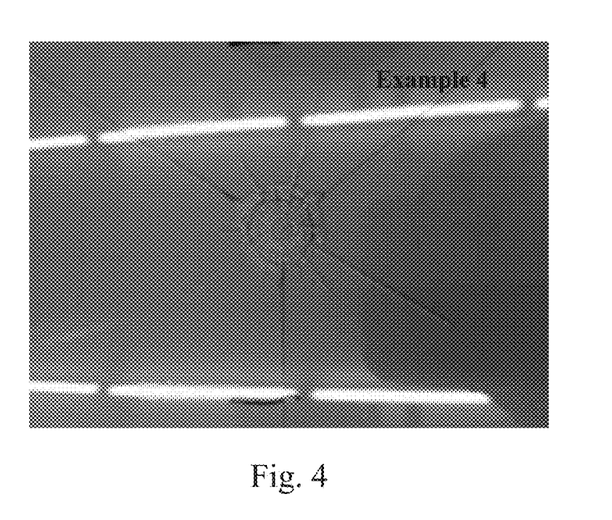
FIG. 4 is a photo of a glass substrate coated with the coating composition of the present invention described in Example 4 after impacted.

FIGS. 2 to 4 are photos of different substrates after undergoing the impact test. FIG. 2 shows a glass substrate without any coating; FIG. 3 shows a glass substrate coated with the coating composition of Comparative Example 1; and FIG. 4 shows a glass substrate coated with the coating composition of the present invention described in Example 4 and the coating has a thickness of 20 μm. According to FIGS. 2 and 3, it can be observed that the glass substrate without coating suffered sever damage; and the glass substrate coated with the coating composition of the comparative example 1 exhibited less damage than the glass substrate without coating but still presented obvious cracking and flashing glass fragments. According to FIG. 4, the glass substrate coated with the coating composition of the present invention exhibited highest integrity, showed less cracking and did not generate scattered glass fragment. Therefore, it is proved that the novel organic-inorganic composite resin of the present invention provides a substrate with enhanced hardness and toughness.

What is claimed is:

1. An organic-inorganic composite resin, derived from:
    (A) an inorganic portion comprising ($a_1$) one or more siloxane monomers of formula $(R^1)_n Si(OR^2)_{4-n}$, wherein $R^1$ is independently H, phenyl, $C_{1-6}$ alkyl or a monovalent organic group with an end group selected from the group consisting of amino group, epoxy group, vinyl group, isocyanate group, mercapto group or (meth)acryloxy group; $R^2$ is $C_{1-3}$ alkyl; and n is an integer from 0 to 3; ($a_2$) an acidic catalyst; ($a_3$) silica; and ($a_4$) a siloxane oligomer; and
    (B) an organic portion comprising ($b_1$) one or more acrylic monomers;
    wherein the amount of the ($a_4$) siloxane oligomer ranges from 5 wt % to 23 wt % of the total weight of the solid content of the inorganic portion, and
    wherein the weight ratio of the inorganic portion to the organic portion ranges from 2:8 to 8:2.

2. The organic-inorganic composite resin according to claim 1, wherein the weight ratio of the inorganic portion to the organic portion ranges from 3:7 to 7:3.

3. The organic-inorganic composite resin according to claim 1, wherein $R^1$ is H, methyl, ethyl, vinyl, N-(β-aminoethyl)-γ-aminopropyl, aminopropyl, γ-glycidoxypropyl, β-(3,4-epoxycyclohexyl)ethyl, 3-(methacryloyloxy)propyl or mercapto propyl and R2 is methyl or ethyl.

4. The organic-inorganic composite resin according to claim 1, wherein the ($a_1$) siloxane monomer is a compound selected from the group consisting of: trimethylmethoxysilane, trimethylethoxysilane, dimethyldimethoxysilane, dimethyldiethoxysilane, methyltrimethoxysilane, methyltriethoxysilane, methyltripropoxysilane, tetraethoxysilane, vinyltrimethoxysilane, vinyltriethoxysilane, γ-glycidoxypropyltrimethoxysilane, γ-glycidoxypropyltriethoxysilane, (γ-glycidoxypropyl)methyldimethoxysilane, (γ-glycidoxypropyl)methyldiethoxysilane, β-(3,4-epoxycyclohexyl)ethyl trimethoxy silane, 3-(methacryloyloxy)propyltrimethoxysilane, N-(β-aminoethyl)-γ-aminopropyl methylbimethoxysilane, N-(β-aminoethyl)-γ-aminopropyltrimethoxysilane, γ-aminopropylmethyldiethoxysilane, γ-aminopropyltriethoxysilane, γ-aminopropyltrimethoxysilane and γ-mercaptopropyltrimethoxysilane.

5. The organic-inorganic composite resin according to claim 1, wherein the acidic catalyst is selected from the group consisting of citric acid, hydrochloric acid and acetic acid.

6. The organic-inorganic composite resin according to claim 1, wherein the siloxane oligomer has a structure of $(R^5_3SiO_{1/2})_x(R^6_2SiO_{2/2})_y(R^7SiO_{3/2})_z$ (formula (I)), wherein $R^5$, $R^6$, and $R^7$ are independently methyl, ethyl, phenyl, —OH, methoxy or ethoxy; x>0, y>0 and z≥0.

7. The organic-inorganic composite resin according to claim 6, wherein the ($a_4$) siloxane oligomer has a structure of formula (II) or formula (III):

(II)

(III)

wherein $R^3$ is the same or different and is independently methyl or phenyl; $R^4$ is the same or different and is independently H, methyl or ethyl; and m is an integer from 2 to 20.

8. A coating composition, comprising the organic-inorganic composite resin according to claim 1 and a hardener.

9. A reinforced substrate, comprising a substrate and a film, wherein the film is made of the coating composition according to claim 8 and is formed on at least one surface of the substrate.

10. The reinforced substrate according to claim 9, wherein the film has a thickness in a range from 1 μm to 100 μm.

11. The organic-inorganic composite resin according to claim 1, wherein ($b_1$) one or more acrylic monomers is selected from the group consisting of methacrylic acid, methyl (meth)acrylate, ethyl (meth)acrylate, propyl (meth)acrylate, n-butyl (meth)acrylate, 2-ethylhexyl (meth)acrylate, n-octyl (meth)acrylate, hexyl (meth)acrylate, pentyl (meth)acrylate, heptyl (meth)acrylate, iso-octyl (meth)acrylate, isononyl (meth)acrylate, isobutyl (meth)acrylate, 2-butyl-(meth)acrylate, decyl (meth)acrylate, isodecyl (meth)acrylate, isotridecyl (meth)acrylate, benzyl (meth)acrylate, lauryl (meth)acrylate, 2-hydroxyethyl acrylate, 2-hydroxyethyl methacrylate, 2-hydroxypropyl methacrylate, 2-hydroxypropyl acrylate, and a mixture thereof.

12. The organic-inorganic composite resin according to claim 1, wherein the organic-inorganic composite resin is formed by (i) mixing the inorganic portion comprising components ($a_1$), ($a_2$), ($a_3$), ($a_4$), (ii) heating, (iii) mixing the heated mixture of (i) with the organic portion comprising component ($b_1$), and (iv) heating.

13. The organic-inorganic composite resin according to claim 1, wherein the silica of component ($a_3$) is incorporated into the inorganic portion organic-inorganic composite resin as particles of silica having a particle size ranging from about 10 nm to about 100 nm.

* * * * *